(12) United States Patent
Lacalle Bayo et al.

(10) Patent No.: US 10,249,395 B2
(45) Date of Patent: Apr. 2, 2019

(54) CLEANING DEVICE FOR BOTTOM SURFACES

(71) Applicant: INGENIERIA Y MARKETING S.A., Valencia (ES)

(72) Inventors: Jesús Lacalle Bayo, Valencia (ES); Juan Ignacio Vaquer Perez, Valencia (ES); Miguel Moreno Muñoz, Valencia (ES)

(73) Assignee: Ingenieria y Marketing, S.A., Valencia (ES)

(*) Notice: Subject to any disclaimer, the term of this patent is extended or adjusted under 35 U.S.C. 154(b) by 424 days.

(21) Appl. No.: 15/021,957

(22) PCT Filed: Sep. 20, 2013

(86) PCT No.: PCT/ES2013/070658
§ 371 (c)(1),
(2) Date: Mar. 15, 2016

(87) PCT Pub. No.: WO2015/040248
PCT Pub. Date: Mar. 26, 2015

(65) Prior Publication Data
US 2016/0225469 A1    Aug. 4, 2016

(51) Int. Cl.
*E04H 4/16* (2006.01)
*G21C 19/20* (2006.01)
(Continued)

(52) U.S. Cl.
CPC .............. *G21C 19/207* (2013.01); *B08B 1/04* (2013.01); *B08B 9/087* (2013.01); *E04H 4/1654* (2013.01);
(Continued)

(58) Field of Classification Search
CPC ........ E04H 4/16; E04H 4/1663; E04H 4/1664
(Continued)

(56) References Cited

U.S. PATENT DOCUMENTS 4,304,022 A   12/1981   Sommer
5,205,174 A    4/1993   Silverman
(Continued)

FOREIGN PATENT DOCUMENTS

EP   1472425 B1   11/2004
ES   2368475 T3   11/2011
ES   2404670 T3    5/2013

OTHER PUBLICATIONS

Electric Robot Cleaner, Sweepy M3, found at http://acquasource.gr/detail.asp?qu_prod=419&qu_categ=4&qu_sub=53, 2016.
(Continued)

*Primary Examiner* — Michael D Jennings
(74) *Attorney, Agent, or Firm* — Richard M. Goldberg

(57) ABSTRACT

A cleaning device includes an external casing (1) forming a suction hood and an upper suction mouth (2) and being provided with drive arrangements arranged on each side and equipped with independent motors and corresponding transmission mechanisms on each side; and cleaning rollers (51, 52, 53, 54); sets of internal cleaning rollers (53, 54) disposed close to the center of the hollow interior of the casing (1) and having a width approximately equal to the distance between the side elements (11) of the casing (1); sets of external cleaning rollers (51, 52) located close to the front and rear edges of the casing (1) of the cleaning device and having a total width slightly greater than the width of the casing; a resilient joint at the support for the external rollers; an adhesion turbine, a suction turbine, and auxiliary drive wheels on the internal cleaning rollers.

22 Claims, 11 Drawing Sheets

(51) Int. Cl.
*B08B 1/04* (2006.01)
*B08B 9/087* (2006.01)
*G21C 17/013* (2006.01)
*G21C 19/07* (2006.01)

(52) U.S. Cl.
CPC ........... *G21C 17/013* (2013.01); *G21C 19/07* (2013.01); *E04H 4/1663* (2013.01)

(58) Field of Classification Search
USPC .......................................................... 15/1.7
See application file for complete search history.

(56) References Cited

U.S. PATENT DOCUMENTS

| | | |
|---|---|---|
| 5,454,129 A | 10/1995 | Kell |
| 2009/0300862 A1* | 12/2009 | Schneider ............. E04H 4/1654 15/1.7 |
| 2012/0174326 A1 | 7/2012 | Finezilber |

OTHER PUBLICATIONS

Weda N600, found at http://weda.se/industry/n600/, 2016.
ATOX underwater bottom cleaner, found at http://www.atox.co.jp/english/technique/inspection/, 2016.

\* cited by examiner

CLEANING DEVICE FOR BOTTOM SURFACES

BACKGROUND OF THE INVENTION

This invention refers to a floor cleaner specially designed to be used in critical areas with difficult accessibility or restricted access, such as the pools used for housing a reactor vessel at a nuclear power station, in which human presence must be avoided as far as possible or only be for the shortest possible time, when this is absolutely necessary.

According to the invention, the floor cleaner comprises:
A casing or housing provided with a suction mouth;
A set of inner drive rollers;
A set of outer rollers with permanent opposite rotation;
At least one elastic hinge of at least one axle carrying the rollers;
Gear motor assemblies for the roller movement
A set of sealed connections and a first control body;
Lighting systems;
At least one camera for taking pictures.

The pools in which the reactor of a nuclear power station is housed are made up of a compartment which may be in a regular or irregular shape and have dimensions that can range from one or two dozen meters on the smaller horizontal side to several dozen meters on the larger side, with a height of several meters, able to temporarily house a large number of the components of the reactor in the dismantling stage.

The base of these pools tends to be of irregular shape. On one hand there are small-sized recesses which have to be cleaned preferably before emptying the pool, as these could contain radioactive material, and there are also uneven parts of the floor, due to the bolts for holding the vessel of the reactor, amongst other reasons.

A device is thus required for cleaning the floors of the pools in which reactors of nuclear power stations are housed which is able to clean narrow spaces, to the maximum width of the apparatus and which is able to get over any small obstacles which it might come up against.

STATE OF THE ART

There are different types of floor cleaners. First of all there are manual cleaners, in which a rod is used to guide the cleaning head; this head is connected by means of a suction hose to a pump and normally to a filter to be returned to the pool.

EP 1472425 describes an independent floor cleaner for pools which comprises a set of support wheels and is provided with filtration and pumping means. It does not have means of controlling the movement.

A robot device known on the market as "ZODIAC Sweepy M3", comprises a pair of lateral drive chains driven by motors and also comprises a motor for pumping water through a filter. The cleaning width is nevertheless interior, between the drive chains, for which reason it is far from the outer edges. Furthermore, since this is conceived for cleaning swimming pools, it is not designed to get over obstacles.

In the nuclear industry, the "WEDA N600" device is also a compact device able to be handled in remote control or in automatic mode, which has, like the previous one, a pair of drive chains, in this case with front and rear brushes of a width approximately equal to that of the body of the device and in which the extraction system installed in the apparatus itself expels the water through filter bags.

The "ATOX underwater bottom cleaner" device has a structure similar to the previous ones, in that this is provided with lateral drive chains, with a filtration body operated with an exterior pump. One major disadvantage of this device is its weight, apart from the difficulties of cleaning the side zones, for the reasons given above.

Other devices, even whilst meeting some of the characteristics described in the devices mentioned, are machines of greater size, weight, cost and with the disadvantages also described above, without the manoeuvring capacity which is intended to be solved with this invention.

Furthermore, any of these can be held up by a small obstacle, such as a bolt head two or three centimeters high, when said obstacle is not directly confronted by one of the drive chains.

SUMMARY OF THE INVENTION

The invention being proposed consists of a floor cleaner which comprises a casing or housing carrying the other items, which forms a suction bell. This is moved by drive wheels or chains (belts); it is preferable for the movement to take place by means of belts, as the possibility of the device being held up on an obstacle, such as a bolt head, is lower if this option is used. It is driven by means of independent motors, with variable speed and rotation direction, meaning that, depending on the rotation direction of the motors, the cleaner can move forward when both belts rotate at the same speed in one direction, move in reverse when they rotate inversely in respect of the above or rotate on its own axis if the belt movements are mutually inverse or with displacement when the speeds of the belts are different.

For proper cleaning of the floor, there are interior rollers and exterior rollers. In particular, according to the preferred embodiment, two interior rollers are used, with the suction bell between them, and two rollers (two geometrical axles carrying the rollers). The interior set of these rollers has a smaller size than the width of the cleaner, insofar as these are driven from at least one of its sides. As was already seen, however, the cleaning has to be done without being able to leave any zones uncleaned, for example beside the walls. The outer rollers are thus divided into two portions, and driven from the centre, so that the free end of each side reaches the width required; in particular the length of the rollers is greater than the width of the cleaner casing. The rollers are made up of a core and a sheath. It has been found that an ideal sheath for proper cleaning is made up of rubber strips, arranged radially (in a transversal direction to the movement). Hence, at least some of the strips will have to be positioned radially in respect of the roller axis. These transversal strips may be joined to strips arranged on a plane perpendicular to the axle of the roller without impairing their operation.

The exterior rollers (and preferably also the interior ones) rotate towards the interior of the suction bell (they drag the dirt along the floor towards the interior of the suction bell). The movement of the rollers and especially that of the interior rollers in respect of the exterior ones may be mutually independent (with different motors and mechanical systems) or can be synchronised with each other (driven by a single motor) but is always independent from the displacement movement of the cleaner, driven by two independent motors.

For the movement of the rollers and the drive belts, there are respectively motors and mechanical transmission assemblies, each formed of a plurality of pinions engaging each other.

As has already been stated, the exterior rollers are driven from the central part; this central drive is made up of an arm or support which houses a mechanism, and sustains the corresponding parts of the lateral rollers projecting outward. This means that the exterior rollers do not properly clean a central zone, which is why this zone has to be cleaned by the interior rollers. The sheath of the interior rollers must therefore be continuous on the longitudinal plane on which the mechanism for driving the exterior rollers is located, especially the front rollers.

Throughout the cleaning process different obstacles may come up, such as screw heads, bolt covers, etc. These obstacles do not tend to be over 2 or 3 cm in height but no compact conventional system is able to get over them without becoming jammed. If the arm carrying the front or rear rollers is rigidly fixed to the housing of the cleaner, this makes it jam, since on rising up the obstacle, it also undesirably raises the drive belts, and the device loses traction. For this reason it has been designed for the front arm to be hinged, and to be subject to an elastic retaining tension, so that the elevation tension is lower than the cleaner's effective weight in the water and so that when an obstacle is reached said arm rises over the obstacle and the cleaner continues its displacement and after the obstacle is reached by the drive belts, these are indeed able to get over this with no further problems, the arm returning to the normal working position when the elastic tension caused on reaching the obstacle has been released.

Sometimes small obstacles are nevertheless located in the centre of the cleaner and are not reached by the drive belts. To solve this drawback, at least one of the rollers, normally the front interior roller, has been provided with a set of wheels joined to its axle, so that when the cleaner comes up against an obstacle, these wheels continue to pull. The wheels have a smaller diameter than that of the corresponding brush, so that they will not be in contact with the floor unless an obstacle with sufficient height is found. This guarantees that the cleaning is correct in routes with no obstacles.

For the proper support of the rear interior rollers, which rotate inversely to the front interior rollers, said rollers are also designed to be fitted with wheels. However, in the event of both wheels (those of the front rollers and the rear rollers) coming into contact with an obstacle and their inverse movements being compensated, blocking the device, said wheels are designed to be freely rotating, constituting only a support which does not force any inverse movement because of the movement of the corresponding brush.

The alignment of the support wheels of the interior rollers with the position of the arm holding the mechanism for driving the exterior rollers should be avoided.

The suction head forming the external casing or housing comprises an upper suction mouth which is connected to a suction pump; the element for connection to the pump is designed to be freely rotating at both mouths and obliquely at 45° in its central zone allowing positioning with no restriction both from the upper end and from any lateral position.

The casing is made up of lateral elements and an upper cover closed at the front and rear by the relevant rollers According to one option each of the lateral elements is formed of separate parallel plates which define a chamber housing mechanical transmission assemblies.

As a means of adhesion to the floor, to maximise the cleaning capacity, the casing comprises a turbine which takes the water from the inside of the bell, and ejects this outwards in the opposite direction, upwards when the cleaner is on the floor.

Since the device may be used in a dark zone, such as the pool of reactor vessel at a nuclear power plant, the cleaner is designed to have lighting means, at least in the forward motion direction, but possibly also for reverse movement.

It is also designed for this to have at least one camera and possible two, one at the front and one at the rear, so that the state of cleaning achieved can be known at all times as well as the directions to be taken.

The cleaner comprises an electronic control system. The electronic control system determines the actions of speeds and movement directions of each of the motors for driving the displacement or movement of the rollers and the turbine, of the lighting and picture-taking elements, or indicates any fault which might arise in the device. The electronic system comprises a sealed connection box for connecting the electric supply and control cables of the device.

The control body is preferably formed of at least two elements, one of these constituting the actual electronics of the device, and the control system is normally placed in a remote unit, this remote unit normally being a computer. It could possibly have an intermediate unit, for example in a float which minimises the requirements of control cable sections, when the distances are excessively long, and which allows control by means of wireless means, where applicable.

BRIEF DESCRIPTION OF THE DRAWINGS

In order to illustrate the following explanation eleven sheets of drawings are attached to this descriptive report, representing the essence of this invention in twelve figures and in which.

DESCRIPTION OF THE FORMS OF EMBODIMENT OF THE INVENTION

Figure 1:
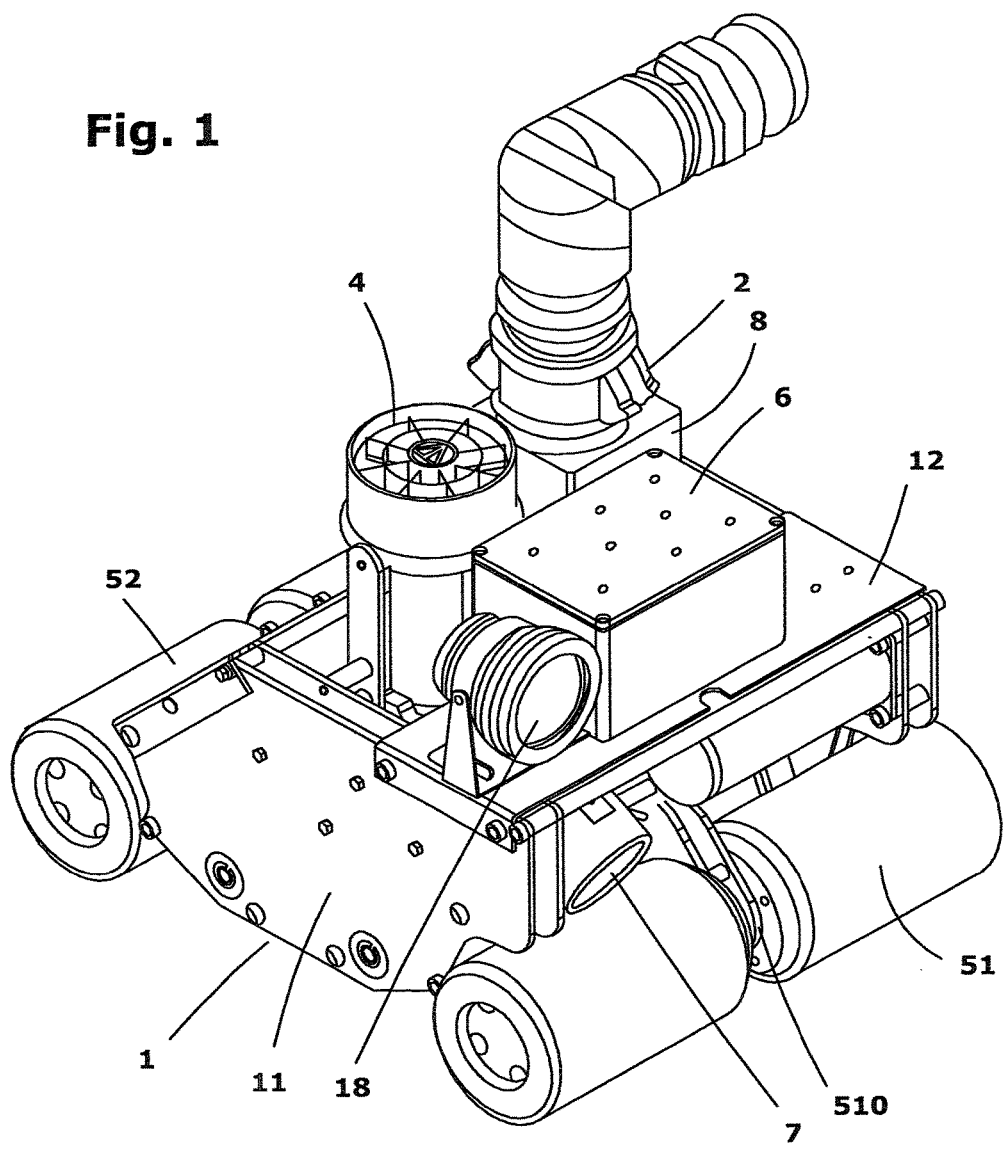
FIG. 1 shows a general view in perspective of the floor cleaner of the invention.
Figure 2:
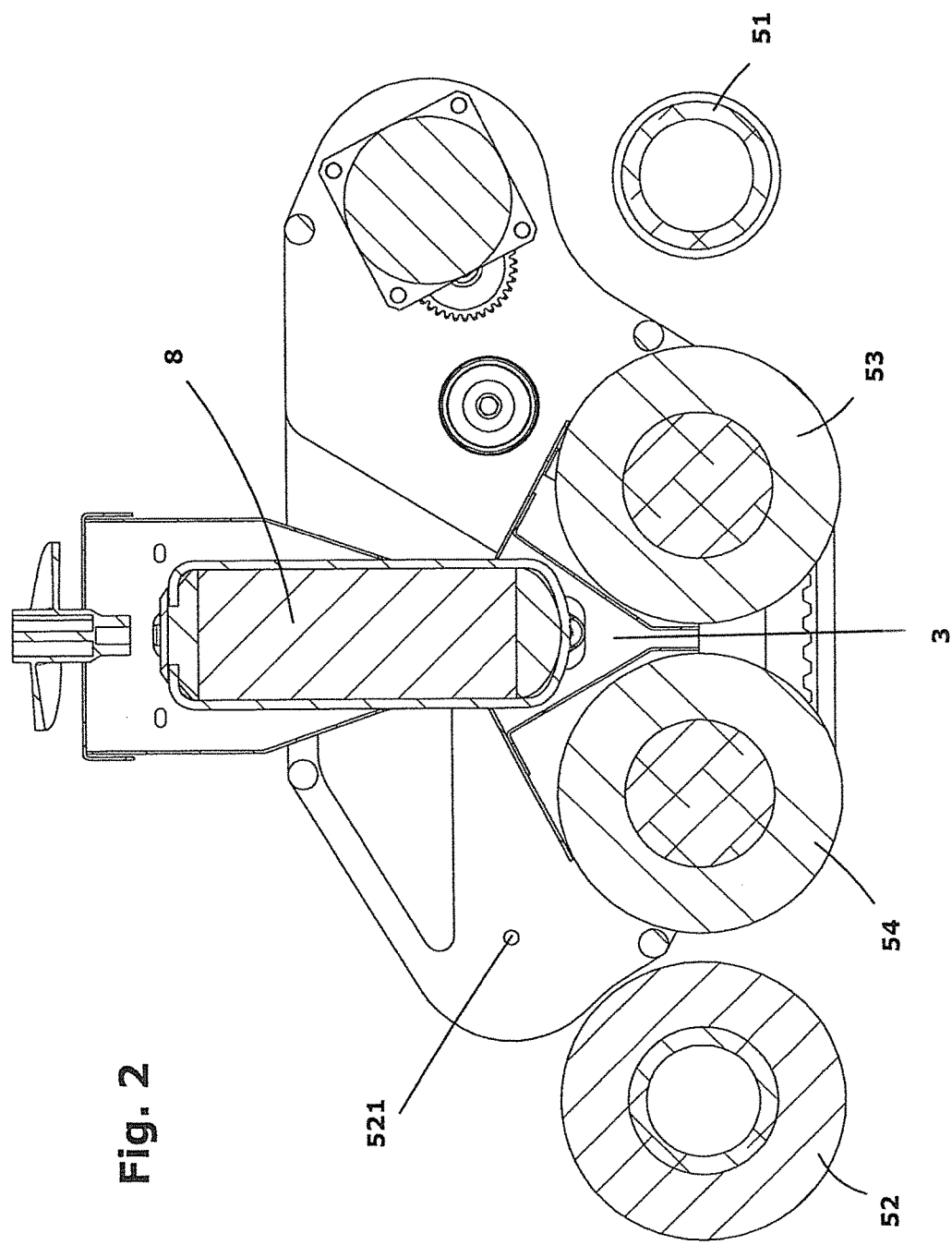
FIG. 2 shows a longitudinal interior section view, from a non-central plane, of the device of FIG. 1.
Figure 3:
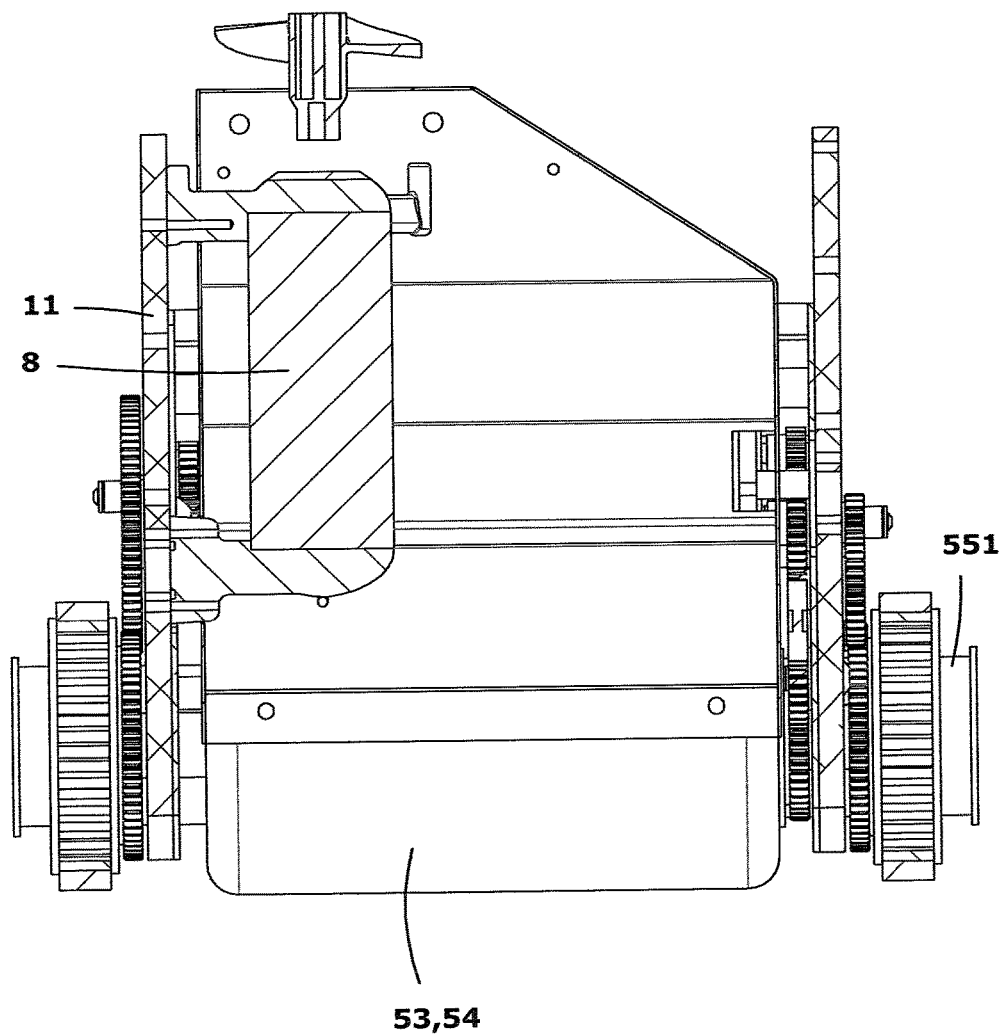
FIG. 3 shows an interior cross-section view of the device of FIGS. 1 and 2.
Figure 4:
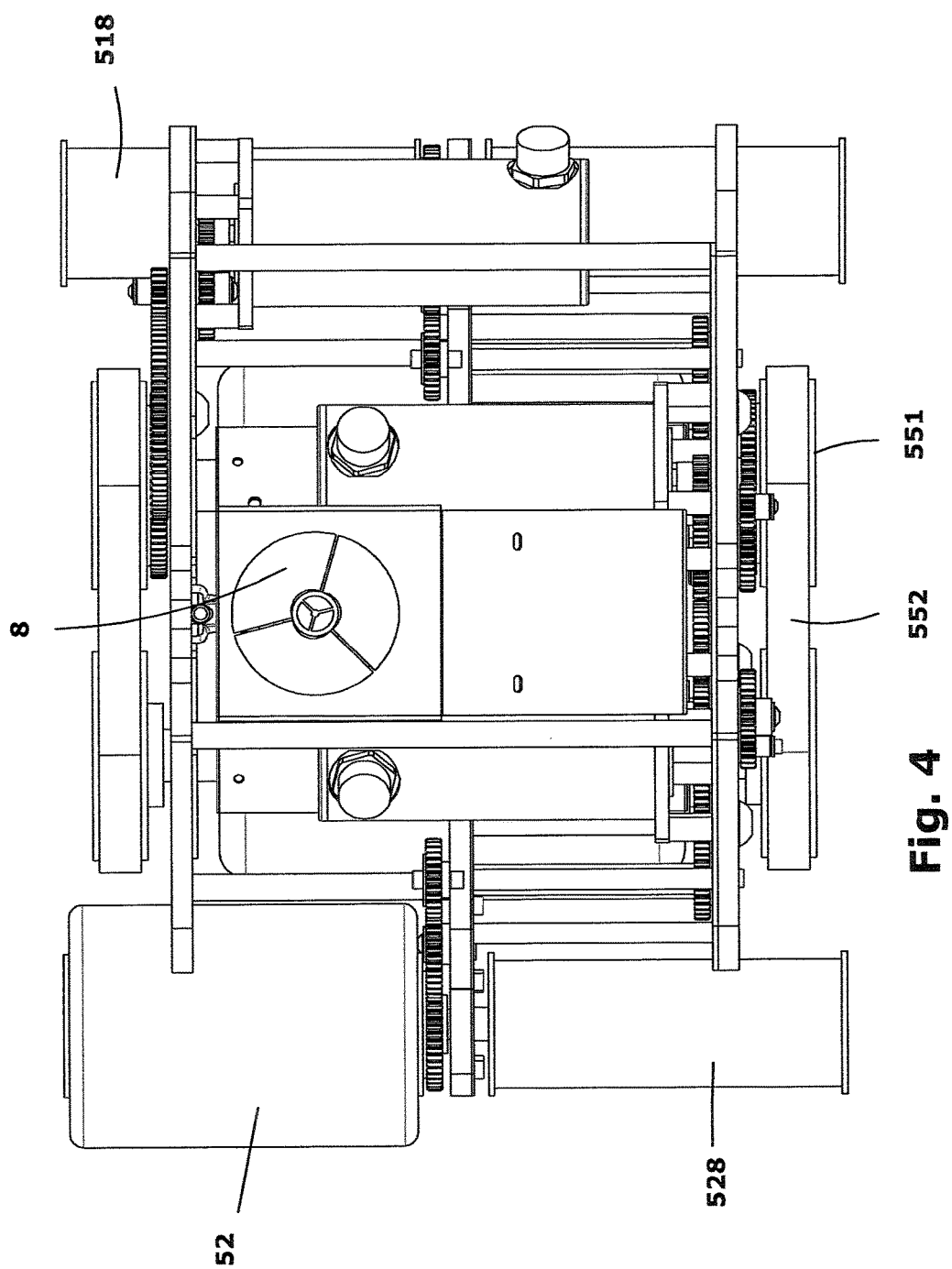
FIG. 4 shows a general upper view of the device covered by the invention according to a first form of embodiment.
Figure 5:
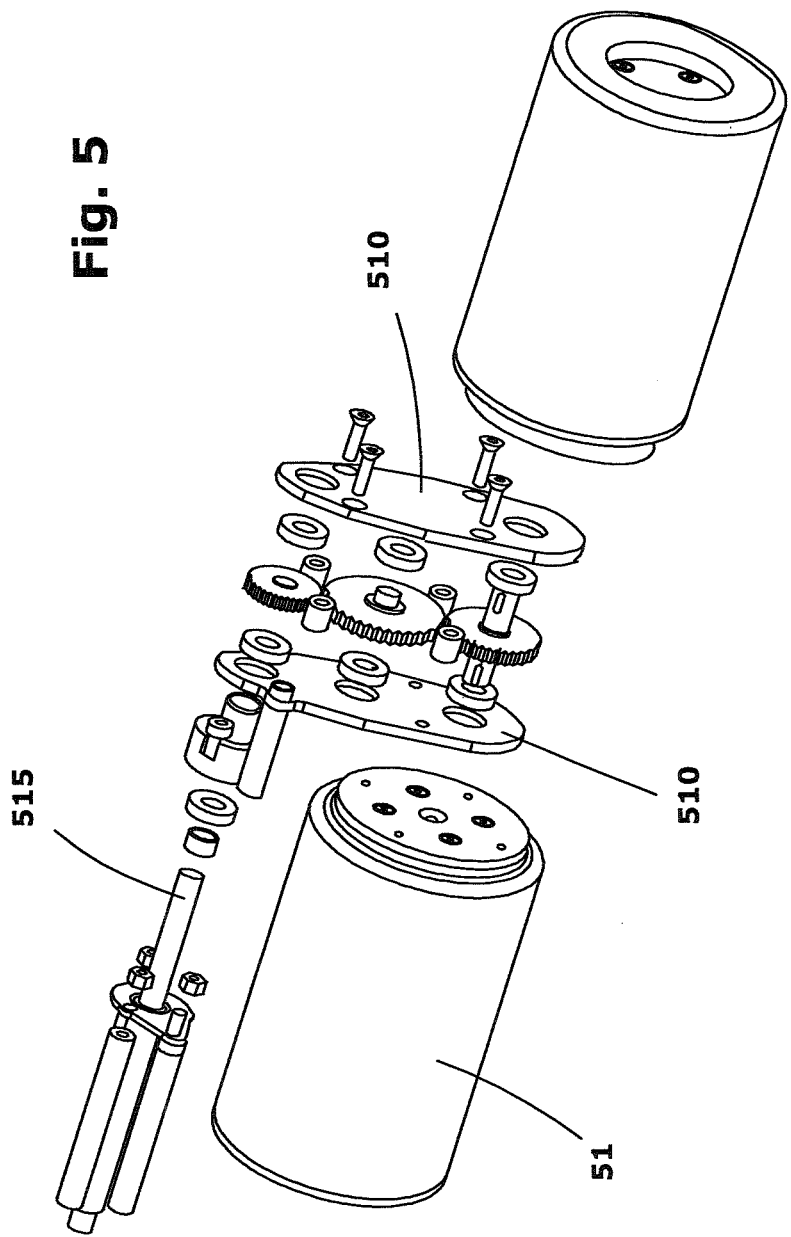
FIG. 5 shows an exploded view of a detail of a fixed arm carrying the exterior rear rollers of the cleaner.
Figure 6:
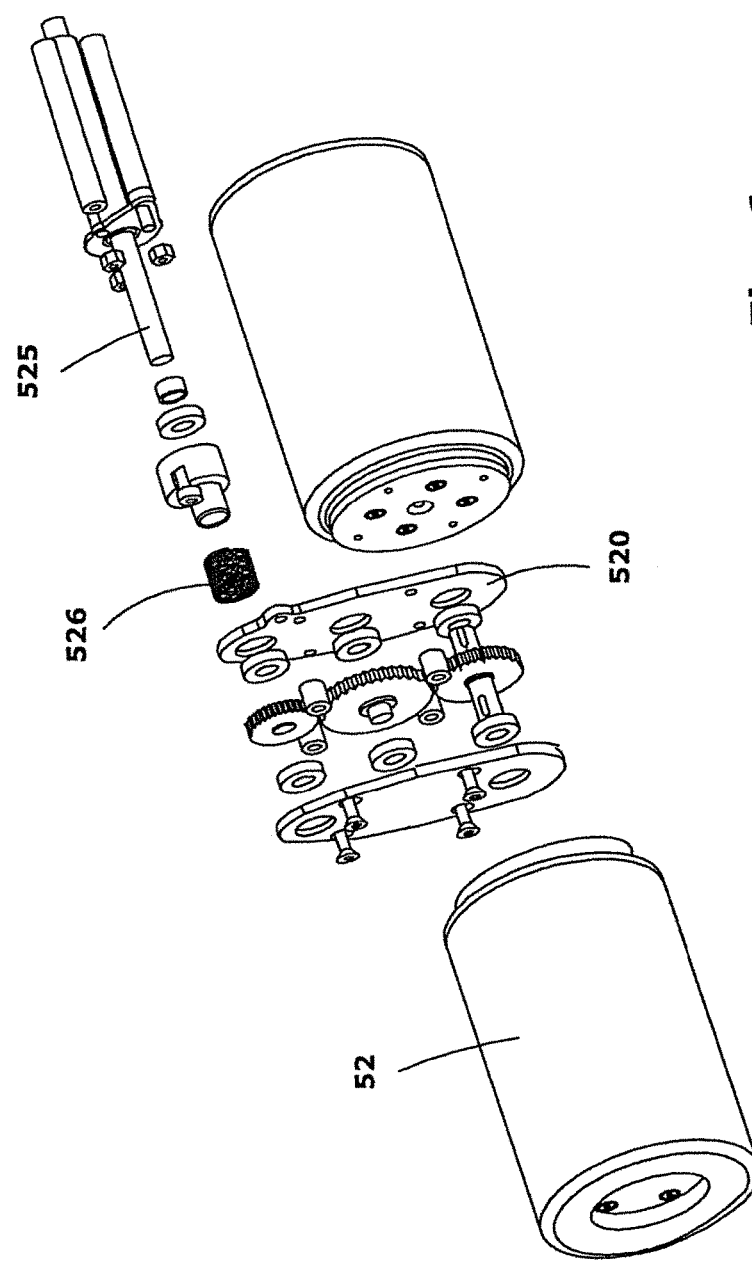
FIG. 6 shows an exploded view of a detail of a hinged arm carrying the exterior front rollers of the cleaner.
Figure 7:
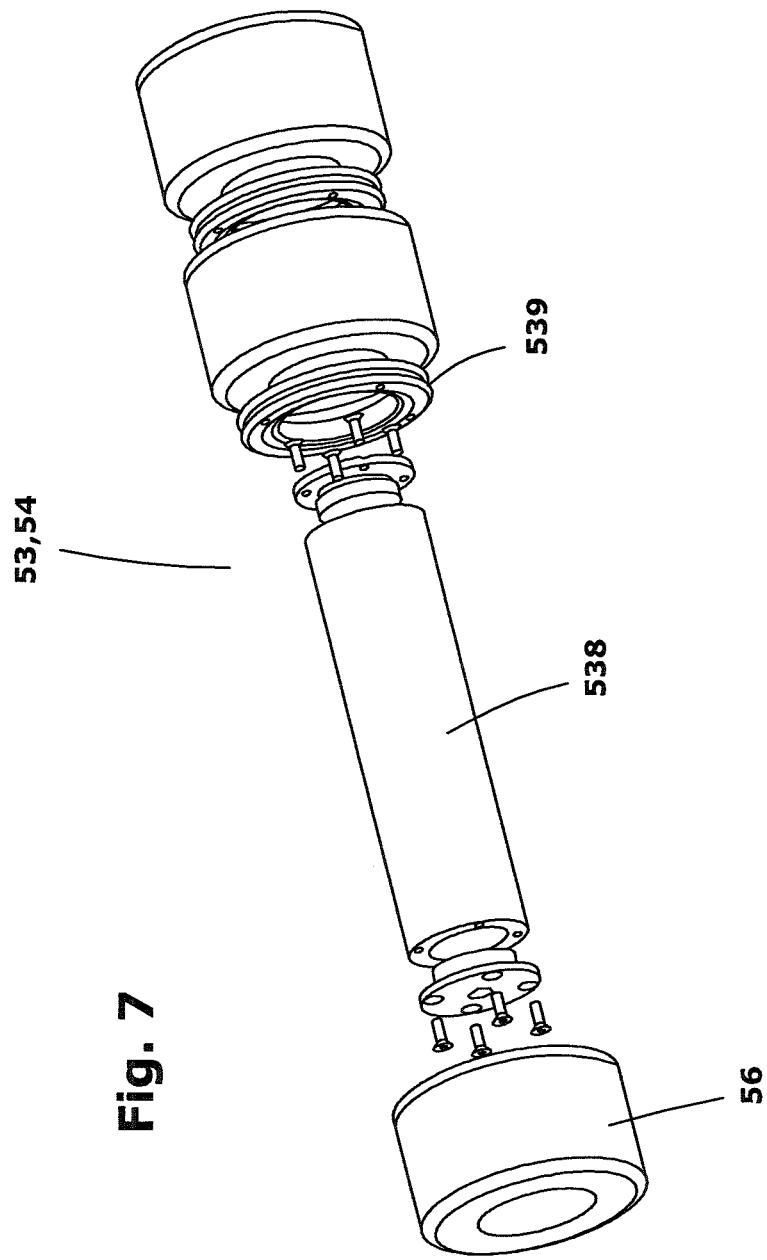
FIG. 7 shows an exploded view of a detail of the interior front rollers provided with pulling wheels.
Figure 8:
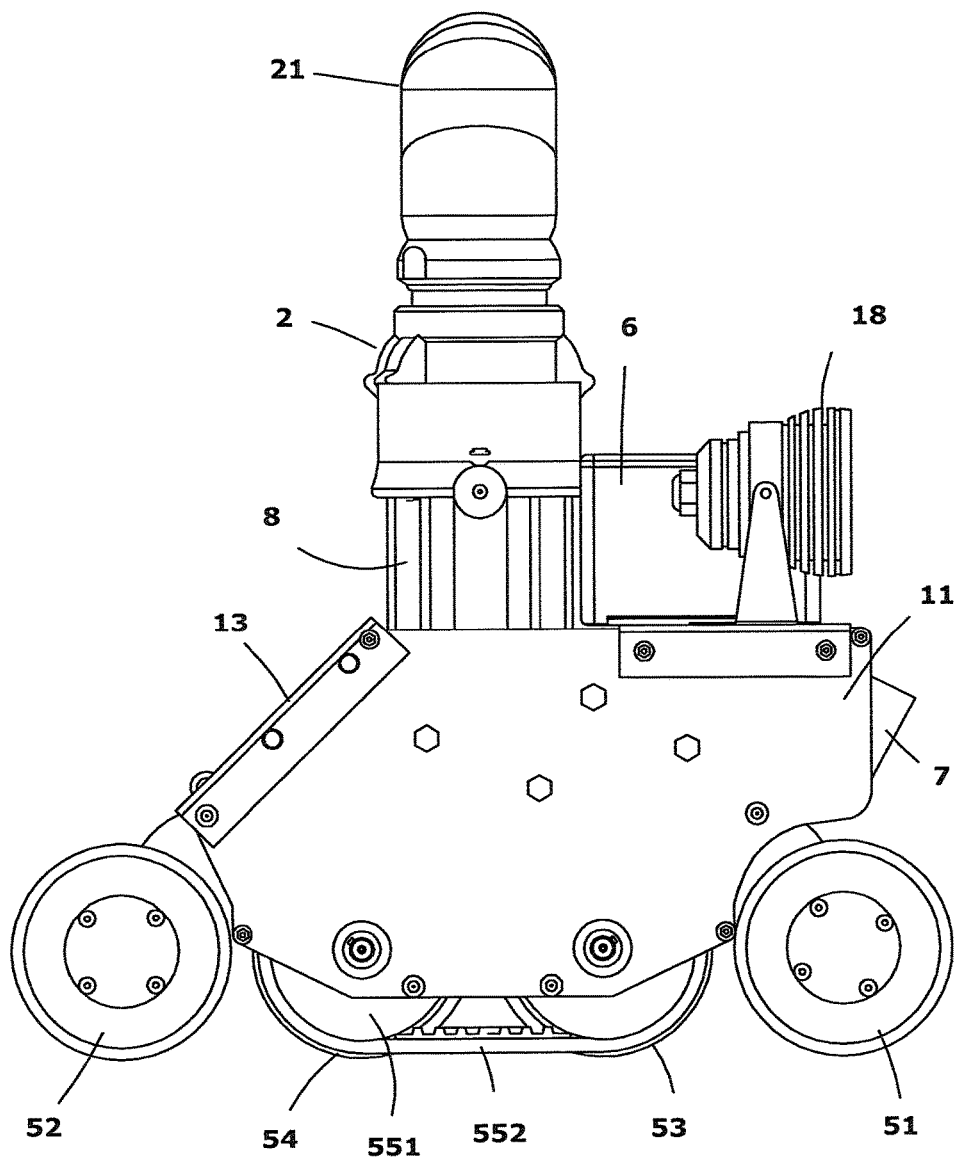
FIG. 8 shows a lateral view of the device seen in FIG. 1.
Figure 9:
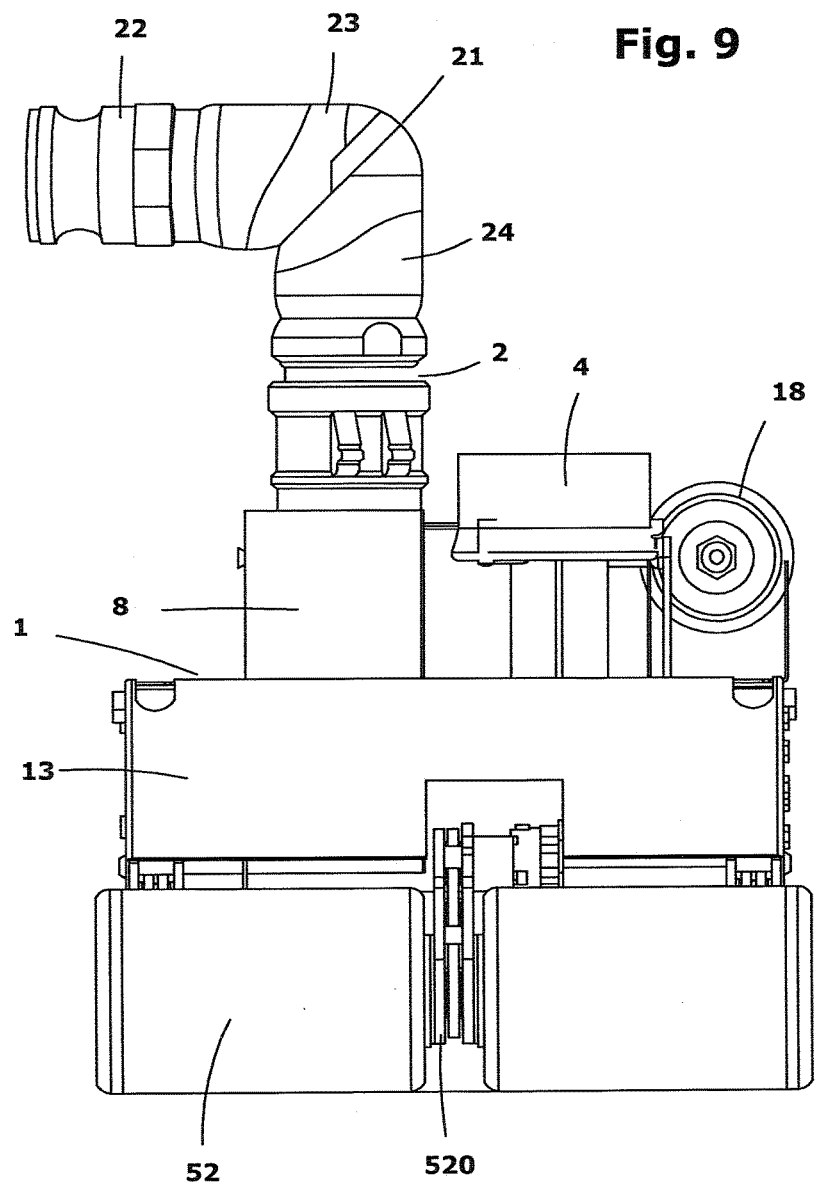
FIG. 9 shows a front view of the device seen in FIG. 1.
Figure 10:
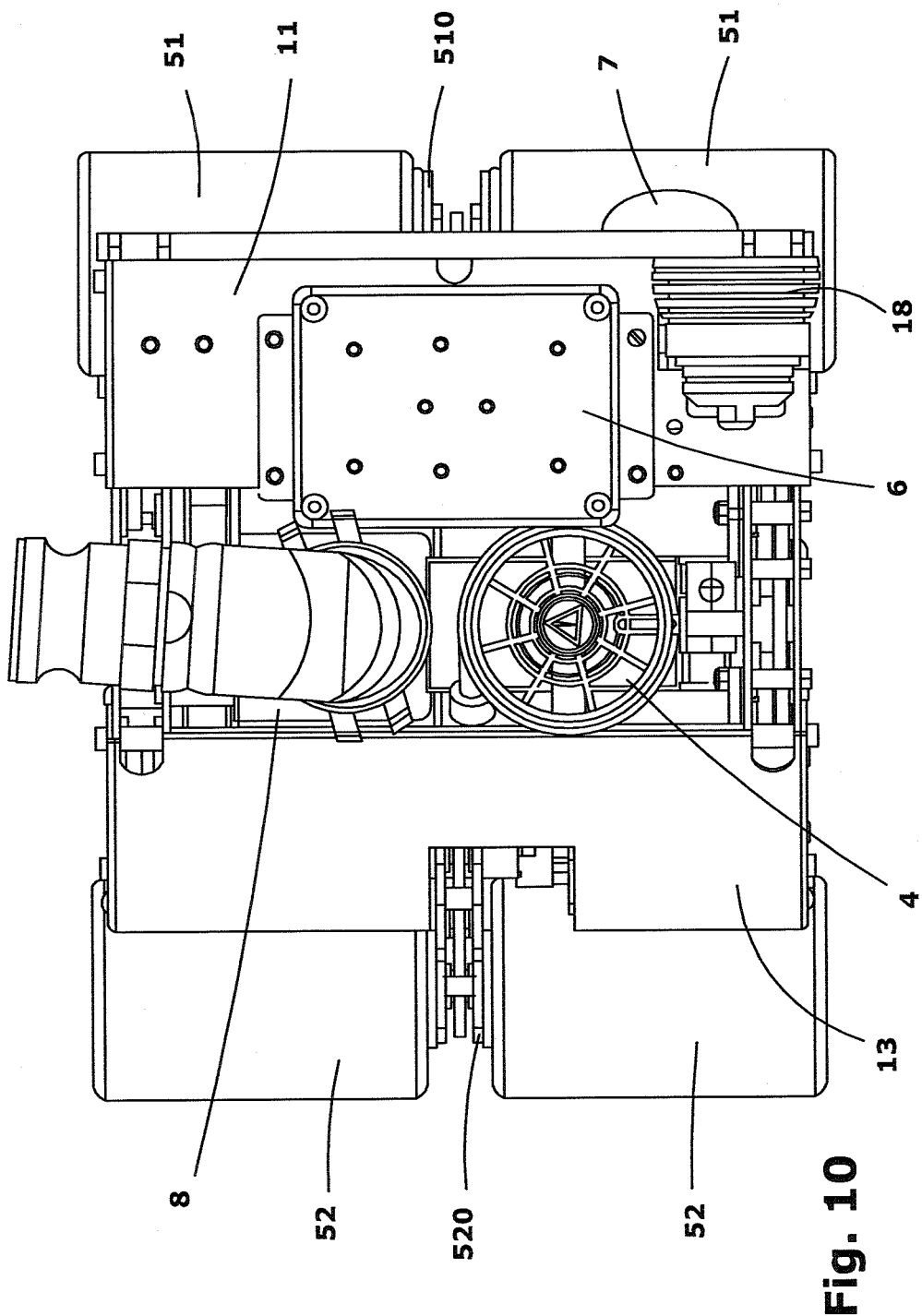
FIG. 10 shows an upper view of the device seen in FIG. 1.
Figure 11:
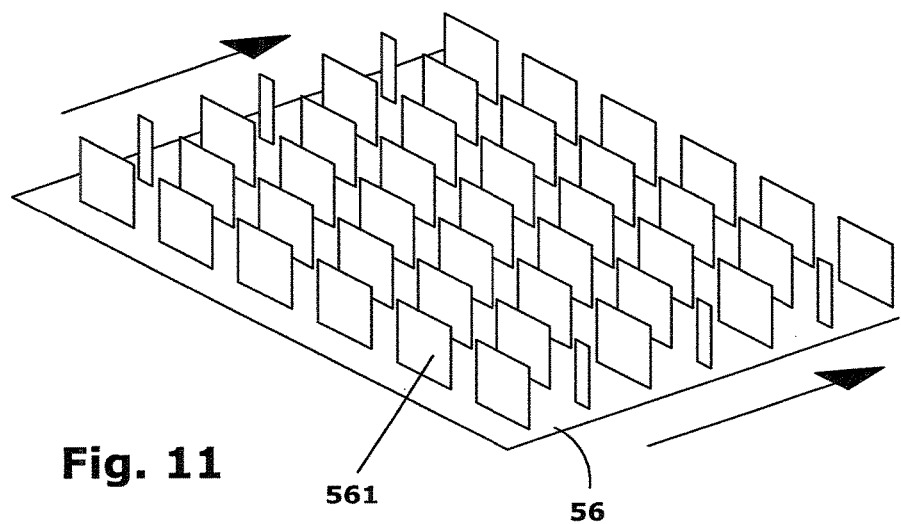
FIG. 11 shows a flat development of the casing of the rollers according to a specific embodiment.
Figure 12:
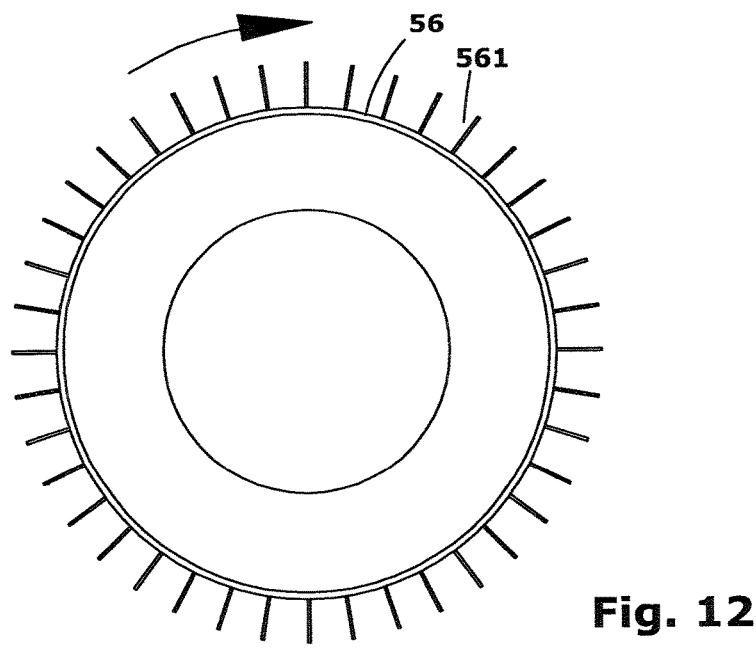
FIG. 12 shows a cross-section view of a cleaning roller provided with the casing seen in FIG. 11.

The invention being proposed consists, as stated in the heading, of a floor cleaner, governed by remote control, which is suitable for use in cleaning the floors and walls of the pools housing the vessel of nuclear power stations, which comprises:

A casing (1) provided with a suction mouth; the casing (1) is mainly made up of components of stainless steel; this casing consists of lateral elements (11) and a top cover (12) on one of the sides (rear) and according to a specific configuration, an oblique cover (13) on the opposite side (front); in one option the side elements are made up of a double wall which houses transmission elements; it was nevertheless preferred to replace the double wall with a single thick wall which simplifies the operations for assembling the different transmissions, keeping the whole assembly rigid;

A traction device; the traction device is preferably made up of a belt (552) normally housed on a pair of pulleys (551), set on each side of the cleaner and driven by independent drive motors and transmission mechanisms on each of the sides so that the speed of the movement and the rotation direction can be regulated simply by moving both motors in one direction, in another or in different directions at the required speed; a motor with adjustable speed located in the body of the casing (1) moves an axle transferring the rotation movement to one of the sides and a mechanical system of gears transmits this to at least one set of pulley wheels placed on each side; the belt (552) may have a toothed interior matching the outside of the pulleys (551), so as to guarantee absolute control of the movement with no unwanted sliding;

A set of cleaning rollers: the rollers are made up of a core (518, 528, 538) and a sheath; the sheath is made according to a preferred option of a strip (56) an elastic material, such as rubber, formed of or comprising in its outer surface at least one set of lamellae (561) arranged in a radial position, i.e. transversal in respect of the rotation direction; said lamellae (561) may be complemented by others arranged in planes transversal to the roller axis (51,52,53,54), or in other directions; there are exterior cleaning rollers (51,52) which are located at the front and rear edges of the casing and interior cleaning rollers (53,54) which are located inside the casing, between the drive belts or between the lateral elements (11) which sustain these; the cleaning rollers (51, 52, 53, 54) can be driven by means of a single motor which transmits the movement to the motor axles of both of these by means of the corresponding transmission mechanisms, or by means of more than one motor, independently for each roller, or with each motor driving a set of rollers; hence, the movement of the interior rollers (53,54) can for example be independent from that of the exterior cleaning rollers (51,52), and thus also be independent from the drive motors and the transmission mechanisms; the roller movement is such that these will always drag any dirt found at the bottom towards the inside of the casing, and particularly towards the suction zone; the width of the interior rollers is thus limited by the width of the casing; it is nevertheless a requisite for the cleaning to be carried out at the maximum width of the devices, without a wall or any other similar obstacle being able to limit the lateral cleaning capacity; for this reason the exterior cleaning rollers (51,52) reach the required width on the outside, at the limit of or outside the width of the device; for this purpose they are fitted on respective central arms (510, 520) which support these, and which have the corresponding transmission mechanisms, with the cleaning roller (51,52) being formed of two separate portions and sustained only by its central part (by one end of each of the portions); in accordance with one option, the separate portions may be independently supported, so that the corresponding arm (510,520) is independent for each side, and in the event of there being any type of hinge of said arm (510,520) the axle of the two portions could become out of alignment; said option is not nevertheless considered preferential due to its mechanical complexity, even though it is considered within the scope of the invention; it is designed for at least one of the arms (520), to be elastically hinged so that it can pivot on an axle (521) located in the body of the casing (1); when an obstacle is reached the elastic retaining of the arm (520), which keeps this in a position aligned with the floor (as for the rest of the rollers), is overcome. This means that the arm allows the cleaning roller (52) which this sustains to rise, thus preventing the cleaner from becoming jammed on said obstacle; FIG. 5 shows a configuration of the fixed arm (510) without elastic retention; FIG. 6 shows a configuration of the hinged arm (520) with elastic retention by means of a spring (526); the power shafts (515,525) for the movement in the fixed and hinged arms are respectively represented in FIGS. 5 and 6; the interior rollers (53,54) are continuous and have a core made up of a single rigid body, and their drive mechanism is placed on at least one of their sides; on the other hand, the exterior rollers (51,52) are divided so as to present two external portions, with a central drive mechanism in the arms (510,520) which constitute the single support of each of said portions; the inner rollers (53,54) are provided with one or more support wheels, with movement linked to the roller on which these are located, or free in respect of this. It is specifically designed for the movement to be linked in the rollers which turn in the movement direction and free in the opposite direction. For proper cleaning, the support wheels (539) of the interior rollers are intended not to be aligned with the arms (510, 520) and drive mechanisms for the exterior rollers, in which there is no exterior cleaning;

The casing (1) also comprises a suction bell (3) which is a chamber defined by the housing or casing (1) between the two inner rollers (53,54), with the function to confine the dirt collected from the surface to be sucked by the suction mouth.

The casing (1) also comprises at least one gripping turbine (4); the gripping turbine (4) takes the water from the outside of the casing and drives this in normal direction (perpendicular) and in the opposite direction to the support surface of the rollers (normally horizontal); the greater the discharge force (flow, speed), the greater the adherence to the surface will be;

According to a preferred option, the casing (1) also comprises a suction turbine or pump (8); the internal suction turbine (8), integrated in the cleaner, allows independent operation with no need for any external suction source;

The casing (1) comprises a suction mouth (2); said suction mouth will be provided with a rotating element joined to the casing (or to the suction turbine (8)); according to an option with connection to an exterior suction source. this will also comprise a body for rotation at 45° (21) with a lower element (24) and an upper element (23), in turn provided with a rotating mouth (22). In the event of connecting a filter directly to the suction mouth (2) of the suction turbine (8), the first rotating element will be sufficient;

The casing (1) also comprises at least one light source and a camera for taking pictures;

The casing (1) is provided with a sealed connection box (6) and a control and governing body; due to the sensitivity of the semi-conductors to radiation, it is intended to have an external control body, apart from the cleaner's internal control body, for providing remote control for each of the elements controlled, such as stop-start and speeds and rotation direction of each of the motors, as well as the light, camera, turbines, etc. In the event of the internal control body ceasing to work, the external control body's connections can simply be made to take over for this, so there is no loss in functionality of the device.

In this configuration, the drive and cleaning body has a maximum width of roughly 32 cm and a length of roughly 41 cm, with a height up to the suction mouth under 30 cm, which allows great manoeuvring capacity and can reach recesses which would be impossible for other devices due to their dimensions and structure.

What is claimed is:

1. A floor cleaner, comprising:
    an outer casing which forms a suction bell,
    an upper suction mouth on said casing,
    a pulling arrangement set on opposite sides of the casing, the pulling arrangement fitted with independent drive motors and corresponding transmission mechanisms on each side, and
    cleaning rollers, the cleaning rollers including:
        an assembly of interior cleaning rollers placed close to a center of the casing, and having a width substantially equal to a distance between lateral side elements of said casing, and
        an assembly of outer cleaning rollers placed in a zone close to front and rear edges of the casing of the cleaner, and having a total width greater than a width of said casing.

2. The floor cleaner, according to claim 1, wherein the suction mouth is provided with a rotary element joined to the casing.

3. The floor cleaner, according to claim 1, wherein the suction mouth is connected to an external source of suction.

4. The floor cleaner, according to claim 3, further comprising a body rotating at 45° with a lower element connected to the suction mouth and an upper element, and the upper element is fitted with a rotating mouth.

5. The floor cleaner, according to claim 1, wherein the casing also comprises an internal suction turbine.

6. The floor cleaner, according to claim 1, wherein the casing comprises a filter directly connected to the suction mouth.

7. The floor cleaner, according to claim 1, wherein movement of the outer cleaning rollers is independent from that of the interior cleaning rollers as well as of the drive motors and relevant transmission mechanisms.

8. The floor cleaner, according to claim 1, wherein movement of the outer cleaning rollers is synchronised with that of the interior cleaning rollers, all being moved by a single drive motor and corresponding transmission mechanisms.

9. The floor cleaner, according to claim 1, wherein the interior rollers are continuous, with a core made up of a single rigid body, and the drive mechanism is placed on at least one edge of the rigid body.

10. The floor cleaner, according to claim 1, wherein the exterior rollers are divided into two portions with a central drive mechanism, constituting a sole support for each of said portions.

11. The floor cleaner, according to claim 10, wherein the interior rollers are provided with one or more support wheels, moving along with the roller on which these are located.

12. The floor cleaner, according to claim 11, wherein the support wheels of the interior rollers are not aligned with the mechanism for driving the exterior rollers.

13. The floor cleaner, according to claim 10, wherein the interior rollers are provided with one or more support wheels, moving freely in respect of the roller on which these are located.

14. The floor cleaner, according to claim 1, wherein the rollers are made up of a core covered with a strip made of an elastic material constituting a cleaning brush, which comprises at least one set of lamellae set in a radial position on an outer surface thereof.

15. The floor cleaner, according to claim 1, wherein at least one of front ones of the exterior rollers and rear ones of the exterior rollers are fitted on an arm which is articulated in respect of the casing, and a hinge is provided with an elastic device returning them to a working position when this working position has been altered by the presence of an obstacle.

16. The floor cleaner, according to claim 1, further comprising a turbine for adherence to a support surface, which takes water from outside the bell and expels this water outside perpendicularly to the support surface.

17. The floor cleaner, according to claim 1, further comprising at least one light fixture.

18. The floor cleaner, according to claim 1, further comprising a camera for taking pictures.

19. The floor cleaner, according to claim 1, further comprising an electronic control system for control and governance with sealed connections.

20. The floor cleaner according to claim 19, wherein the electronic system for control and governance is made up of at least two elements, including a first element provided in the cleaner itself fitted with a connection system and another external element, which comprises the control system.

21. The floor cleaner, according to claim 20, wherein at least one of the elements is a computer.

22. The floor cleaner according to claim 19, wherein the electronic control system is duplicated, and includes one unit placed outside the cleaner, and connected by cables directly to the cleaner.

* * * * *